United States Patent
Kose et al.

(10) Patent No.: US 9,254,451 B2
(45) Date of Patent: Feb. 9, 2016

(54) METHOD AND APPARATUS FOR EVAPORATING HYDROGEN HALIDE AND WATER FROM BIOMASS HYDROLYZATES CONTAINING HALOGEN ACID

(75) Inventors: Frank Kose, Berlin (DE); Matthias Schmidt, Dresden (DE)

(73) Assignee: Green Sugar GmbH, Meissen (DE)

( * ) Notice: Subject to any disclaimer, the term of this patent is extended or adjusted under 35 U.S.C. 154(b) by 509 days.

(21) Appl. No.: 13/809,904

(22) PCT Filed: Jul. 12, 2011

(86) PCT No.: PCT/DE2011/001423
§ 371 (c)(1),
(2), (4) Date: Mar. 11, 2013

(87) PCT Pub. No.: WO2012/013177
PCT Pub. Date: Feb. 2, 2012

(65) Prior Publication Data
US 2013/0168226 A1   Jul. 4, 2013

(30) Foreign Application Priority Data

Jul. 14, 2010 (DE) .......................... 10 2010 027 174
Jun. 15, 2011 (DE) .......................... 10 2011 104 723

(51) Int. Cl.
  *B01D 3/40* (2006.01)
  *B01D 1/14* (2006.01)
  *B01D 1/16* (2006.01)

(52) U.S. Cl.
  CPC .. *B01D 3/40* (2013.01); *B01D 1/14* (2013.01); *B01D 1/16* (2013.01)

(58) Field of Classification Search
  None
  See application file for complete search history.

(56) References Cited

U.S. PATENT DOCUMENTS

| 2,743,219 | A | * | 4/1956 | Riehm | ............................ 203/12 |
| 4,237,110 | A | * | 12/1980 | Forster et al. | ................. 423/488 |
| 4,432,805 | A | | 2/1984 | Nuuttila | |
| 6,007,636 | A | | 12/1999 | Lightner | |

FOREIGN PATENT DOCUMENTS

| DE | 102008064325 A1 | | 7/2010 |
| FR | 916382 A | | 12/1946 |
| WO | WO 2008/111045 | * | 9/2008 |
| WO | WO 2012/137201 | * | 10/2012 |

* cited by examiner

*Primary Examiner* — Melvin C Mayes
*Assistant Examiner* — Douglas Call
(74) *Attorney, Agent, or Firm* — Michael Soderman

(57) ABSTRACT

The invention relates to a method and a device with the aid of which hydrogen halide and water are removed from biomass hydrolyzates containing halogen acid. The core of the invention is an evacuated container (B1), which is continuously supplied with a heat-transfer medium and which is completely filled with the heat-transfer medium in a part. In said evaporation chamber, the biomass hydrolyzate is likewise continuously introduced. In the container (B1), heat is transferred from the heat-transfer medium to the hydrolyzate, wherein hydrogen halide and water are continuously evaporated. The remaining hydrolyzate particles are continuously discharged with the cooled heat-transfer medium and continuously removed by means of the heat-transfer medium and continuously separated from said heat-transfer medium. The invention described can also be used to treat other mixtures or solutions for the purpose of evaporation. The following is fundamental in regard to the heat-transfer medium used: the heat-transfer medium is chemically inert with respect to the introduced substances.

16 Claims, 2 Drawing Sheets

Figure 1:
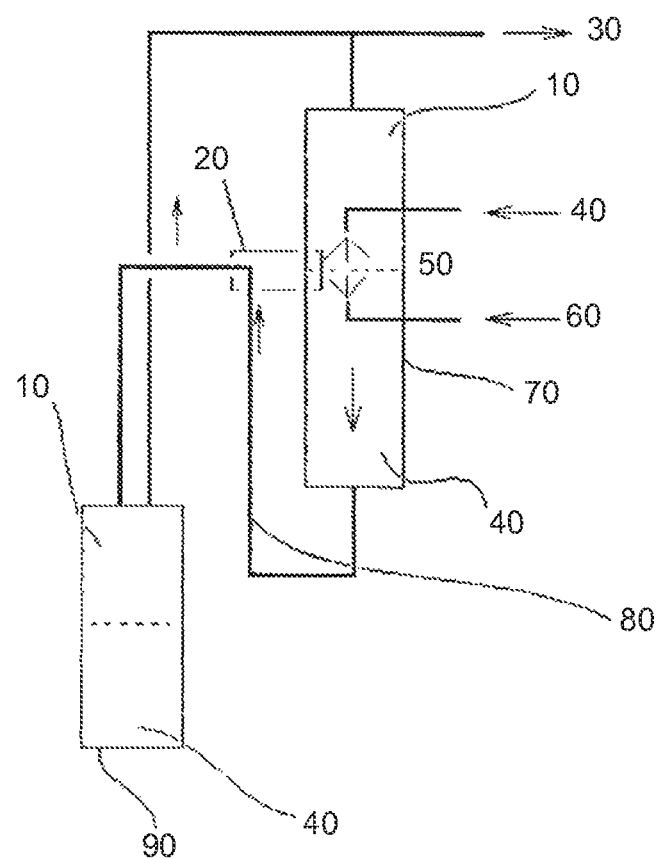

METHOD AND APPARATUS FOR EVAPORATING HYDROGEN HALIDE AND WATER FROM BIOMASS HYDROLYZATES CONTAINING HALOGEN ACID

CROSS REFERENCE TO RELATED APPLICATIONS

This application is the U.S. national stage of International Application No. PCT/DE2011/001423, filed on Jul. 12, 2011, and claims the benefit thereof. The international application claims the benefits of German Application No. 10 2010 027 174.8 filed on Jul. 14, 2010; and No. 10 2011 104 723.2 filed on Jun. 15, 2011; all applications are incorporated by reference herein in their entirety.

BACKGROUND

State of the Art

The fact that hydrogen halides and water from hydrolyzates can be extracted by distillation, using a liquid heat carrier, which does not mix with the hydrolyzate and is chemically inert, has been known ever since the German Reich Patent No. RP 362230 (published on Oct. 25, 1922) was published. In this patent it is described that "in a conventional manner, the volatile hydrochloric acid, by introducing a liquid heat carrier to the sugar solution" is released. "For this purpose, a high-temperature oil, in particular shale oil, is introduced into the solution, which is practically immiscible with the sugar solution [ . . . ] As a result of the temperature increase of the sugar solution hydrochloric acid is released, for an hourly rate of 100 liters of sugar solution [ . . . ] a circulating oil volume of 10,000 liters is required."

With respect to the equipment and process technology, this principle has been further developed, in that the hydrolyzate and heat carrier was sprayed into an evacuated container (Patent DE 10 2008 022 242 A1). Advantages of this solution are:

Hydrochloric acid accumulates to a much lesser extent in the heat carrier, so that an additional processing step as indicated in the patent 362230, is omitted.

The proportion of energy that can be released during the extraction of the halogen acid per volume fraction heat carrier has multiplied.

As specified in the patent RP 362 230 the usable energy for the evaporation was about 16.4 kJ per liter employed heat carrier. In the technical solution in accordance with the further development (patent DE 10 2008 022 242 A1, filed on May 6, 2008), however, about 50.7 kJ are used per liter of heat carrier used for the evaporation. Thus, the circulating amount of oil can be drastically reduced.

It had now been found that the apparatus illustrated in patent DE 10 2008 022 242 A1 can be simplified in that, what in this patent is known as cyclone container 2, will be omitted. This modification has been described in the patent with the title "modified apparatus for the removal of halogen hydracids from biomass-hydrolyzates". The apparatus related disadvantage of the above modification is that the hydrolyzate, and heat transfer medium are intimately mixed by spraying which may lead to formation of an emulsion (so-called sludge). Therefore, the principle was further developed and the following changes were made:

The heat transfer fluid flow is performed as a continuous film on a surface or as a lamella in space.

Super-hydrophilic materials can be used on surfaces for better distribution of the liquid streams.

The aforementioned changes were combined in the form of an externally mixing two-fluid nozzle.

A patent has been filed including these innovations, with the title "Method and apparatus for removing hydrogen-halides and water from hydrolyzates" (German Application DE 10 2010 009 310). The energy portion usable for the evaporation per unit volume of heat carrier was herewith not improved nor deteriorated.

SUMMARY

The invention includes a method and apparatus with which hydrogen halide and water can be extracted and separated from halogen acidic biomass hydrolyzates. Advantages are the compactness of the apparatus, the efficiency of evaporation and the variety of possible arrangement and design, which allows for an adaptation to the particular purpose. Core of the invention is an evacuated container, which is fed continuously with a heat carrier. The heat fills completely a part of the container (evaporation space). In this evaporation space, the biomass hydrolyzate is also introduced continuously. Heat transfer from the heat carrier to the hydrolyzate takes place in the container whereas hydrogen halide and water are evaporated continuously. The remaining hydrolyzate particles are continuously removed together with the cooled heat carrier and continuously separated from the same. The heat carrier and biomass-hydrolyzate particles can be removed via a level drain or via the use of a pump, and the heat carrier can also be returned to the container after separation of the biomass-hydrolyzate particles. The invention may be configured in various ways with the respect to the equipment and apparatus.

The invention described herein can also be used for the treatment of other mixtures or solutions for the purpose of evaporation. The following is fundamental with respect to the heat carrier:

It is chemically inert with respect to the added materials.

It is insoluble with respect to the added substances, and mixes only to that extent with the aforementioned so that the accumulation does not continue unimpeded (equilibration) and that their continued presence not leads to such chemical modification of the heat carrier, so that it cannot be replaced in an economical manner by partial replacement.

The heat carrier can be made up of polyalphaolefins, paraffins, and/or mixtures thereof.

DETAILED DESCRIPTION

The Invention

Surprisingly, it has now been found that the previous disadvantages of the above-described principle can be eliminated, the apparatus construction simplified and compacted, and in particular an increase in the efficacy with respect to the amount of energy used per unit volume of the heat carrier is achieved.

DESCRIPTION OF THE INVENTION

The principle of the invention will be explained with reference to FIG. 1. Two containers B1 and B2, which are connected by an ascending-and-overflow-pipe to each other such that the tube ascends from bottom of B1, then rise along the side of B1 upwards, at a certain height, which is below the lower edge of the upper container lid of B1, it horizontally bends (further "kink") and then enters B2 from above, whereas B2 is (preferably completely) placed below B1. Both containers are vacuumized (usually 50 mbar) using top-mounted equipment. When first starting up the apparatus according to the process presented here, the warm heat carrier is sprayed through a downwards pointing nozzle into B1. B1 starts to fill up simultaneously with the ascending-and-overflow-pipe. If B1 has filled to the extent that the kink has been reached, the heat carrier begins to flow into the vessel B2. The liquid surface (hereinafter called phase boundary) between the heat carrier in B1, and vacuum does not rise further. The heat carrier flow is oscillating into a constant flow, which leads from the nozzle via B1, ascending-and-overflow-pipe to B2. In this arrangement the heat carrier nozzle is arranged above the phase boundary, however, a different arrangement in B1 would not be of a disadvantage for the level adjustment of the phase boundary. It is important that the horizontal portion of ascending-and-overflow-pipe ("overflow" in the following) is not filled completely. This constraint can be achieved easily by the geometrical parameters of B1 (diameter), ascending-and-overflow-pipe (also diameter) as well as flow rate of the heat carrier are matched to one another accordingly. B2 is for the purposes of the indicated arrangement a (under vacuum) collector-container since the actual process of evaporation takes place in B1.

After equilibration of the phase boundary, a nozzle is turned on, which is below the phase boundary (that is, within the heat carrier), and over which the hydrolyzate is sprayed. Immediately a turbulent zone forms above the hydrolyzate-nozzle, which is due to the fact that the heat in the heat carrier and the homogeneously distributed hydrolyzate-droplets heat up and hydrogen halide gas and water vapor bubbles form. In this zone, from two-third up to three quarters of the liquid volume will be evaporated. The remaining now high-viscosity-particles are carried with the flow downwards. On the way down the remaining amount of liquid is evaporated. Using this approach, virtually the entire amount of hydrogen halide and water can be evaporated. Herewith this procedure will reach at least the same evaporation-efficacy as known methods. An advantage is that, in contrast to the known methods, no emulsions are formed. The hydrolyzate-particle sediment onto the bottom of B2. Such behavior could previously only be achieved if the heat carrier was applied as a film or lamella.

The invention described display significant additional advantages.

First, the process control is much simpler. Spraying requires a very large container volume. This corresponds to the mode of action, based on the fact that the hydrolyzate and heat carrier particles are evenly distributed as tiny particles after the mixing. By the non-hindered gravitational acceleration in vacuum sprayed particles are also accelerated so fast that an appropriate minimum level must be maintained. If the heat carrier is in the shape of a film, smaller containers can be used. However the necessary installations in order to achieve this are much more sophisticated than a simple nozzle. The by far smallest volume of the three alternatives can be achieved with the inventive arrangement. This is due to the fact that the energy density, based on a volume element of the used vaporization chamber, is at its maximum, because of the closed phase of the heat transfer medium. By using simple nozzles it is a simple and robust method which can easily be put in use.

Secondly, the energy used per unit volume heat carrier for the evaporation could be increased to at least 60 kJ/l. Relative to the notes in the patent RP 362230 a reduction of the amount of heat carrier (in circulation flow) by a factor of 3.6 was achieved. This value has already been reached with a non-optimized experimental set-up. A further considerable decrease can be expected. One way to achieve this is by simply increasing the dwell time of the hydrolyzate particles in the flowing medium. This can be achieved in the following ways. One way is to increase the height of B1 and place both nozzles at a higher position. This can be done easily but only within certain limits, since the hydrostatic pressure of the liquid column (the heat carrier) also affects the evaporation. A second possibility is to extend the ascending-and-overflow-pipe to a container, whereby the residence time of the particles is increased. The diameter of the enlarged tubing (and hence the flow rate) has to be selected so that the particles are carried upwards and thus reach the phase boundary at the kink. This effect could already be detected in gradient-experiments. The volume flow of the hydrolyzate was raised uniformly at a constant volume flow of the heat carrier. The exhaust vapors in the ascending-pipe are removed from the system in B2. Both methods are easy to implement in the equipment.

Figure 2:
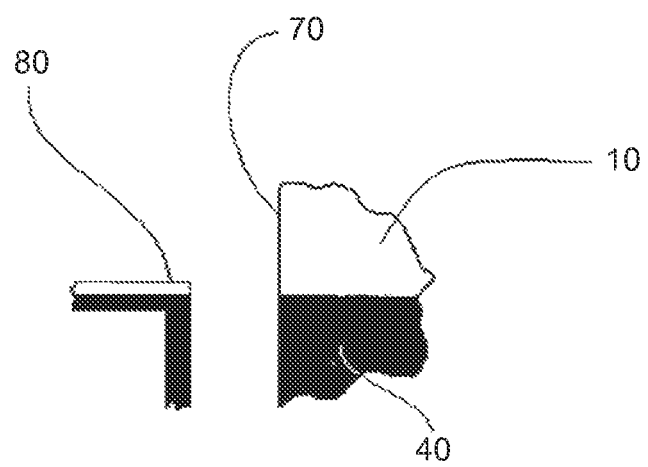

Thirdly, the arrangement shown in FIG. 1 describes an arrangement which itself is able to self-regulative behavior in the case of boilover and its automatic elimination. To clarify operations referred to in FIG. 1, an enlarged view is shown in FIG. 2. In the event that the turbulent zone abruptly increases (called "boilover"), for example, by boiling retardation the level increases in B1 also erratic. This means that the level increases at the overflow drains and leads to increased heat carrier drain. At the same time the influx of the heat carrier in the container B1 is unchanged. As a result B1 is depleted of heat carrier, whereby the boilover is prevented, as the total thermal energy is reduced in B1. Once the evaporation process has returned to normal, the level of heat carrier is lower than before the boilover. The overflow from the ascending-and-overflow-pipe also stops until the operating level in B1 has come to rest.

As can be seen, the arrangement presented thus has many advantages.

It has been shown that the arrangement presented must substantially be taken much further than is shown here in FIG. 1. FIG. 1 illustrates "only" the fundamental principle.

Thus, the following variations are possible and equivalent in terms of effectiveness:

The nozzle for the introduction of the hydrolyzate can if situated above the heat carrier be directed downwards. The evaporation takes place at the point of intersection of the two spray cones (assuming that the geometrical shape of the sprayed material can be described as a cone) and on impact on the phase boundary.

The nozzle for the introduction of the hydrolyzate can be situated above the heat carrier nozzle and directed upwards and afflicted by a second downward directed heat carrier nozzle.

The insertion device for the hydrolyzate does not necessarily include nozzles. Some alternatives are presented here:

simple tube with opening perforated plate tube with an attached porous filter tube (ring) with holes nozzles and nozzle assemblies of any kind, rotating disc double walled pipe (in the center: hydrolyzate, between inner and outer wall: fluid) for the purpose of tempering the hydrolyzate prior to entry.

The hydrolyzate can partially vaporize as it flows through the supply pipe on its way to the hydrolyzate nozzle. This is done with an appropriate design and operation of the feed pipe via the space filled with heat carrier (for example, as shown in FIG. 1). By pre-evaporation of the water and hydrogen halide in the nozzle, a two-component atomization is achieved. This operating principle is in use, for example in perfume bottles; butane is fed into the tube to the outlet nozzle and is evaporated prior to reaching the nozzle to provide a very fine atomization of the perfume. Also in the present invention a finer distribution of the hydrolyzate is achieved.

Also other insertion devices for the hydrolyzate, apart from the nozzle insertion device as described in this invention can be considered for implementation. One can connect a mixing apparatus in front of the insertion device, in which the hydrolyzate is mixed with the flowing heat carrier and then introduced into the evaporation chamber through a simple pipe. In the evaporation chamber only heat transfer and evaporation takes place but no distribution of heat carrier.

It shows therefore with respect to the purposes of the invention that the evaporation is associated with the presence of a closed heat carrier phase, which fills a portion of the evaporation tank completely, and that the evaporation has (mainly and finally) led to the complete removal of hydrogen halide, and water. It is not in the sense of the invention that heat carrier is brought to the hydrolyzate (RP 362 230), but the same hydrolyzate in this closed phase, i.e. the heat carrier. In the following, the part of the evaporation tank, which is completely filled with the heat carrier, will be referred to as "evaporation chamber".

Further options in the configuration of the invention are obvious since the invention is based upon a continuous operation, which includes the following assumptions:

heat has to be continuously introduced into the evaporation chamber in order to cause evaporation.

hydrolyzate has to be introduced continuously into the evaporation chamber.

hydrogen halides and water vapors have to be removed continuously.

Hydrolyzate particles and heat carrier have to be separated continuously form each other after evaporation.

For example, there are apparatus design option based upon how the heat is supplied, such as:

The heat carrier is added to the chamber in a hot mold and withdrawn from the same in a cold mold and heated outside the vaporization chamber (indirect heating)

The heat carrier in the evaporation chamber is heated by an external heating system (for example, jacket heating; i.e. direct heating)

The heat carrier is heated via a combination of direct and indirect heating

The level of the heat transfer medium can be kept constant within the container

If the heat carrier is removed from or added to the chamber under direct heating there is a variety of ways to do this. For example, the heat carrier can be injected above the vaporization chamber and removed at the bottom (corresponding to design in FIG. 1). This results in a vertically downward flow. The heat carrier can also be entered via a variety of insertion devices below and discharged via an overflow at the upper end. In this case the container B1 and the ascending-and-overflow-pipe would be combined into one container. It results in a vertical upward flow heat transfer. Also, the lateral entry through nozzles which are arranged along the side wall, combined with a discharge via a projecting pipe into the evaporation chamber is possible. In which manner a filling and emptying is made in the apparatus is not essential to achieving the advantages of the invention. Important is however that the filling of the evaporation chamber with a heat carrier is complete, which can then transfers heat for the purpose of evaporation of the hydrolyzate and the continuous feeding of the heat in the evaporation chamber. It is obvious that the evaporation space of the apparatus according to the design can take different forms. For example, one could expand a tubular evaporation chamber conically upwards where the hydrolyzate enters the evaporation chamber. During evaporation a strong gas release under volume expansion takes place, which is taken into account by applying the conical extension. The released gas can evaporate much easier in this configuration. Another apparatus design includes heating via a heating jacket. Within the pipe, which is equivalent to the evaporation chamber, a flow of the heat carrier is generated in that an additional tube with a smaller diameter is mounted axially in the evaporation chamber. The hydrolyzate is added into the tube with the smaller diameter. This tube fully immersed in the heat transfer medium and can be covered at its upper and lower end by the flowing heat carrier. Inside this tube, the heat carrier is cooled by evaporation, and heated outside the tube. At the same time a gas development takes place within the tube. The overall result is that a convective flow is created which ensures that heat is lead into the inner tube and enables evaporation in the inner tube. In order to suppress any possible foam formation on the surface of the heat carrier, the latter could be pre-heated and sprayed onto surface. In total this would result in a combination of indirect and direct heating.

The equipment related alternatives for removal of the hydrolyzate after hydrogen halide and water has been removed completely, are as varied as the problem is universal. It is therefore possible that the heat carrier within the vaporization chamber is lead vertically from bottom to the top with sufficient high flow rate so that the hydrolyzate particles with a high density are carried upward. In the upper part sieves are mounted, which are permeable for gas, but not for hydrolyzate particles. If those sieves are tilted, the particle flow can be guided. If instead a tube is used, it is advantageous if it is shaped as a cone standing on its tip. The flow carries the particles forward. The separation of gaseous and solid phase takes place on the sieves. The particles are guided to the container axis and fall thereby into an axially oriented collecting device which is situated under the sieve. It is also connected with a pipe for the continuous removal of the particles. However, it is also possible that the hydrolyzate particles are carried out together with the cooled heat carrier from the evaporation chamber and via settling and/or centrifugation and/or hydrocycloning and/or combinations of these possibilities separated from the heat carrier. The design of the discharge apparatus is therefore not the core of the invention, but a component of the invention, namely, an expression of the need for heat carrier and hydrolyzate to be brought together for the purpose of evaporation in an evaporation chamber, and thereafter to be separated again.

Taken together all the necessary components, it results in the following summary description of the invention An evacuated container is in one part, called evaporation space, completely filled with a hot heat carrier, which is chemically inert and does not mix with the hydrolyzate.

Hydrolyzate is introduced into the evaporation chamber.

In the evaporation chamber, evaporation of hydrogen halide and water takes place in that heat of the heat carrier is transferred to the hydrolyzate.

Emergent vapors are removed out of the space located above the evaporation chamber.

Heat is introduced continuously into the vaporization chamber as well as into the heat carrier located there.

Hydrolyzate particles which are free from hydrogen halide and water can be continuously separated from the heat carrier and released.

The invention describes a process for continuous evaporation of liquids for the purpose of removal of dissolved substances which cause equipment problems during evaporation. This is not limited to hydrolyzates. For example, the presented invention can also be used for separating water from sea water for the purpose of desalting. Salt in the evaporation container lead often to strong encrustations. By means of the present invention, the salt can in the form of salt crystals precipitate from the heat carrier and be removed without causing apparatus difficulties and damage. Also mixtures can be separated. For example, acetone and water, as both vaporize at different temperatures. Instead of the solid particles, after the evaporation two phases would form, the heat of the heat carrier as well as the non-evaporated liquid. A prerequisite for the function is always the chemical inertness of the heat carrier and its poor miscibility with the remaining phase. In order to characterize this "miscibility" it is enough to know that accumulation of substances from the added liquids do not continue unimpeded (equilibrium), and that their continued presence does not lead to such a chemical modification of the heat carrier so that the economic operation of the process can not be made possible by the partial replacement of the heat transfer medium.

LIST OF REFERENCE NUMERALS

10 Vacuum
20 Detail
30 Vapors to the vacuum pump
40 Heat carrier
50 Phase boundary
60 Hydrolyzate
70 Container B1
80 Ascending-and-overflow pipe
90 Container B2

The invention claimed is:

1. Process for the continuous evaporation of halogen hydracids and water from biomass-hydrolyzates characterized in that water- and halogen-hydrate-containing biomass-hydrolyzates are continuously transferred into an evacuated container which is partially filled with a heat carrier that is chemically inert and insoluble with the biomass hydrolyzates and water and that is continuously heated so that the supplied heat will in whole or in part be transferred to the biomass-hydrolyzate for the purpose of evaporation of water and halogen hydracids, which are then continuously removed and separated via the top of the container, while biomass-hydrolyzate-particles that have formed are continuously removed at the side or from the bottom of the container and separated, wherein the biomass-hydrolyzates are fed into the container via at least one of a nozzle below the phase boundary of the heat carrier and a nozzle pointing downwards above the phase boundary of the heat carrier, said nozzle creating a two-component atomization effect.

2. A method according to claim 1, characterized in that underpressure is applied at the head of the container.

3. A method according to claim 1, characterized in that biomass-hydrolyzate is preheated and brought into the container independently of the heat carrier.

4. A method according to claim 1, characterized in that the biomass-hydrolyzate is introduced into the gas-containing-part of the container above a heat transfer medium in the container.

5. A method according to claim 1, characterized in that the biomass-hydrolyzate is added to the heat carrier.

6. A method according to claim 1, characterized in that the biomass-hydrolyzate and/or the heat carrier is introduced through a porous filter into the container.

7. A method according to claim 1, characterized in that the biomass-hydrolyzate and the heat carrier are introduced into the container in such a manner that a convective flow is induced in the heat carrier in the container.

8. A method according to claim 1 characterized in that the level of a heat transfer medium in the container is kept constant.

9. A method according to claim 1 characterized in that the heat carrier and biomass-hydrolyzate-particles are removed via level drain or the use of a pump.

10. A method according to claim 1 characterized in that the heat carrier is introduced into the gas-containing-part of the container.

11. A method according to claim 1 characterized in that the heat carrier is introduced above the insertion of the biomass-hydrolyzate.

12. A method according to claim 1 characterized in that a heat transfer medium is introduced through nozzles.

13. A method according to claim 1, characterized in that the heat carrier containing biomass-hydrolyzate particles is brought back into the container after horizontal or vertical discharge, and after separation of the biomass-hydrolyzate-particles.

14. A method according to claim 1 characterized in that the heat loss in the heat carrier, before it is returned to the container, is completely or partially compensated by heat supply.

15. A method according to claim 1, characterized in that the heat loss of the heat carrier is completely or partly compensated by heat supply via the wall of the container.

16. A method according to claim 1, characterized in that polyalphaolefins, paraffins, and/or mixtures thereof, are used as heat carriers.

* * * * *